United States Patent
Takahashi et al.

(10) Patent No.: US 9,533,700 B2
(45) Date of Patent: Jan. 3, 2017

(54) STEERING APPARATUS

(71) Applicants: JTEKT CORPORATION, Osaka-shi, Osaka (JP); TOYOTA JIDOSHA KABUSHIKI KAISHA, Toyota-shi, Aichi-ken (JP)

(72) Inventors: Yuji Takahashi, Obu (JP); Tomonori Sugiura, Yamatokoriyama (JP); Shoji Ishimura, Kashihara (JP); Tatsuro Kubota, Shiki-gun (JP); Shigeru Hoshino, Toyota (JP)

(73) Assignees: JTEKT CORPORATION, Osaka-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/060,107

(22) Filed: Mar. 3, 2016

(65) Prior Publication Data
US 2016/0264170 A1   Sep. 15, 2016

(30) Foreign Application Priority Data
Mar. 9, 2015 (JP) .................................. 2015-046049

(51) Int. Cl.
*B62D 1/19* (2006.01)
*B62D 1/184* (2006.01)

(52) U.S. Cl.
CPC ............... *B62D 1/195* (2013.01); *B62D 1/184* (2013.01)

(58) Field of Classification Search
CPC .................................. B62D 1/195; B62D 1/184
See application file for complete search history.

(56) References Cited

U.S. PATENT DOCUMENTS

| | | | |
|---|---|---|---|
| 2010/0282016 A1* | 11/2010 | Oehri ..................... | B62D 1/195 74/493 |
| 2010/0300236 A1* | 12/2010 | Goulay .................. | B62D 1/195 74/493 |
| 2012/0024101 A1* | 2/2012 | Schnitzer ............... | B62D 1/195 74/492 |

(Continued)

FOREIGN PATENT DOCUMENTS

| | | |
|---|---|---|
| EP | 2423073 A1 | 2/2012 |
| JP | 2010-254204 A | 11/2010 |

(Continued)

OTHER PUBLICATIONS

Jul. 18, 2016 Search Report issued in European Patent Application No. 16158673.0.

*Primary Examiner* — Darlene P Condra
(74) *Attorney, Agent, or Firm* — Oliff PLC (57) ABSTRACT

A steering apparatus includes a steering shaft; a column jacket including an outer jacket including a slit and a pair of fastened portions, and an inner jacket; a bracket; a fastening mechanism; an engaged tooth formation member including at least one engaged tooth and fixed to the inner jacket; a support shaft including end portions supported by support holes of the fastened portions; an engaging tooth formation member including an engaging tooth that engages with the engaged tooth; and a biasing member configured to bias the support shaft in a biasing direction. One of the fastened portions or a member supported by the one fastened portion includes a positioning portion configured to position the support shaft in the biasing direction.

4 Claims, 7 Drawing Sheets

(56) References Cited

U.S. PATENT DOCUMENTS

| | | | | |
|---|---|---|---|---|
| 2012/0144953 A1* | 6/2012 | Schnitzer | ............... | B62D 1/184 |
| | | | | 74/493 |
| 2012/0205183 A1* | 8/2012 | Rombold | ................ | B60R 25/02 |
| | | | | 180/402 |
| 2013/0074641 A1* | 3/2013 | Schnitzer | ............... | B62D 1/184 |
| | | | | 74/493 |
| 2013/0118292 A1* | 5/2013 | Sulser | .................... | B62D 1/184 |
| | | | | 74/493 |
| 2015/0045126 A1* | 2/2015 | Hansen | .................. | B62D 7/224 |
| | | | | 464/112 |
| 2015/0266497 A1 | 9/2015 | Yoshihara et al. | | |
| 2015/0266499 A1 | 9/2015 | Yoshihara et al. | | |
| 2015/0375767 A1* | 12/2015 | Agbor | .................... | B62D 1/181 |
| | | | | 74/493 |
| 2015/0375770 A1* | 12/2015 | Buzzard | ................. | B62D 1/184 |
| | | | | 74/493 |

FOREIGN PATENT DOCUMENTS

| | | | |
|---|---|---|---|
| JP | 2015-182611 A | 10/2015 | |
| JP | 2015-182614 A | 10/2015 | |

\* cited by examiner

STEERING APPARATUS

INCORPORATION BY REFERENCE

The disclosure of Japanese Patent Application No. 2015-046049 filed on Mar. 9, 2015 including the specification, drawings and abstract is incorporated herein by reference in its entirety.

BACKGROUND OF THE INVENTION

1. Field of the Invention

The present invention relates to a steering apparatus.

2. Description of Related Art

In Japanese Patent Application Publication No. 2010-254204 (JP 2010-254204 A), a projection and a recess of an eccentric cam biased by a biasing spring constituted by a torsion coil spring so as to rotate about a support shaft mesh with an inner-column side, so that a telescopic lock is achieved. Further, when an adjusting lever and a release lever that rotates together with a fastening shaft in an integrated manner displace the eccentric cam so that the eccentric cam rotates in a release direction against the biasing spring, the telescopic lock is released.

A case, in which the support shaft is constituted by a member (a resin member or the like) that can break at the time of a secondary collision, is assumed. In this case, due to variation of component dimensions, a backlash of the support shaft in an axial direction of the support shaft may be caused with respect to a member for supporting the support shaft and a member supported by the support shaft. Accordingly, a breaking load of the support shaft may vary at the time of the secondary collision.

SUMMARY OF THE INVENTION

The present invention provides a steering apparatus that can restrain a backlash of a support shaft in an axial direction of the support shaft.

An aspect of the invention relates to a steering apparatus including a steering shaft extendable in an axial direction; a column jacket extendable in the axial direction, the column jacket including an outer jacket including a slit and a pair of fastened portions provided on respective sides of the slit, and an inner jacket fitted to the outer jacket, the column jacket being configured to support the steering shaft such that the steering shaft is rotatable; a bracket including a pair of side plates provided on respective sides of the pair of fastened portions, the bracket being fixed to a vehicle body; a fastening mechanism including a fastening shaft passed through fastening shaft passing holes of the pair of fastened portions, and an operating lever that rotates the fastening shaft, the fastening mechanism being configured to cause the outer jacket to hold the inner jacket by fastening the pair of fastened portions via the pair of side plates using the fastening shaft; an engaged tooth formation member including at least one engaged tooth and fixed to the inner jacket; a support shaft including a first end portion and a second end portion supported by support holes of the pair of fastened portions, the support shaft being configured to break at a time of a secondary collision; an engaging tooth formation member including an engaging tooth that engages with any one of the at least one engaged tooth, the engaging tooth formation member being rotatably supported by the support shaft, and being configured to rotate in accordance with an operation of the operating lever such that the engaging tooth engages with or disengages from any one of the at least one engaged tooth; and a biasing member provided between the first end portion of the support shaft and one of the side plates opposed to the first end portion, the biasing member being configured to bias the support shaft in a biasing direction directed toward the second end portion of the support shaft. One of the fastened portions opposed to another of the side plates, or a member supported by the one fastened portion includes a positioning portion configured to position the support shaft in the biasing direction.

According to the above aspect, the support shaft is biased by the biasing member provided on the first end portion of the support shaft, in the biasing direction directed toward the second end of the support shaft, and further, the support shaft is positioned in the biasing direction by the positioning portion of the fastened portion or the member supported by the fastened portion. Thus, a backlash of the support shaft in the axial direction of the support shaft is unlikely to occur with respect to components in the vicinity of the support shaft.

In the above aspect, the support shaft and the biasing member may constitute one unit.

With the above configuration, the support shaft and the biasing member are fitted as one unit at the time of assembly. Therefore, it is possible to increase ease of assembly.

In the above aspect, the support shaft and the biasing member may be formed of a single material so as to be integrated with each other.

With the above configuration, it is possible to reduce manufacturing cost.

In the above aspect, the support shaft may include a small diameter portion, a large diameter portion having a diameter larger than a diameter of the small diameter portion, and a stepped portion provided between the small diameter portion and the large diameter portion; the positioning portion may position the support shaft in the biasing direction via an intervening member fitted to the small diameter portion so as to be in contact with the stepped portion and the positioning portion; and the support shaft may be configured to break at positions of both ends of the intervening member at the time of the secondary collision.

With the above configuration, the intervening member fitted to the small diameter portion of the support shaft is in contact with the positioning portion and the stepped portion of the support shaft. Therefore, it is possible to reliably break the support shaft at the positions of both ends of the intervening member at the time of the secondary collision.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
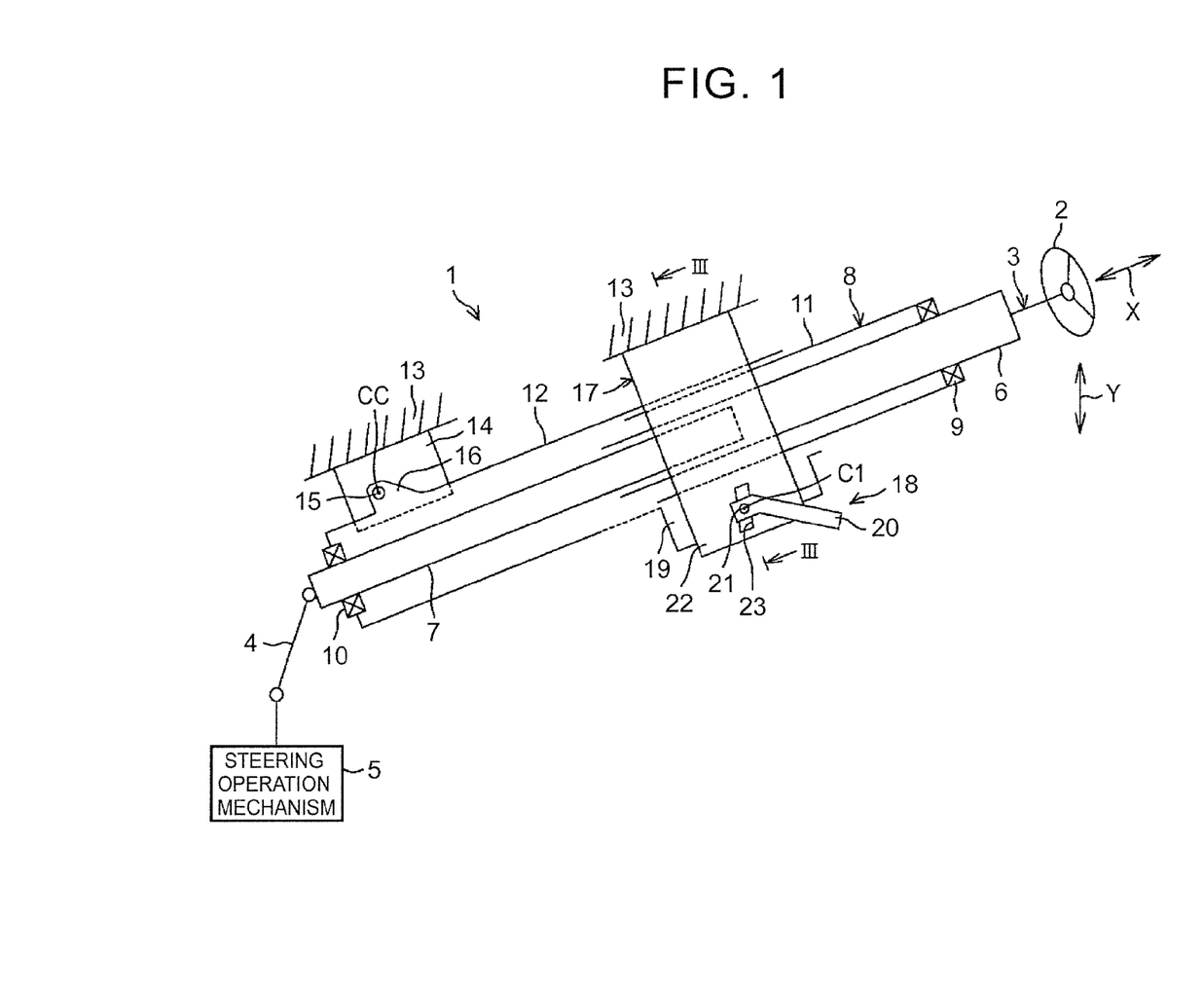
FIG. 1 is a partially broken schematic side view illustrating a schematic configuration of a steering apparatus according to a first embodiment of the present invention.

FIG. 1 is a partially broken schematic side view illustrating a schematic configuration of a steering apparatus according to a first embodiment of the present invention. Referring now to FIG. 1, the steering apparatus 1 includes a steering shaft 3 having one end (an axially upper end) to which a steering member 2 such as a steering wheel is connected; and a steering operation mechanism 5 connected to the steering shaft 3 via an intermediate shaft 4 or the like. The steering operation mechanism 5 is, for example, a rack-and-pinion mechanism that steers steered wheels (not shown) in association with the steering operation of the steering member 2. A rotation of the steering member 2 is transmitted to the steering operation mechanism 5 via the steering shaft 3, the intermediate shaft 4, and the like. Further, the rotation transmitted to the steering operation mechanism 5 is converted into an axial movement of a rack shaft (not shown). Thus, the steered wheels are steered.

The steering shaft 3 includes a tubular upper shaft 6 and a lower shaft 7 that are fitted to each other by, for example, spline-fitting or serration-fitting such that the upper shaft 6 and the lower shaft 7 are slidable relative to each other. The steering member 2 is connected to one end of the upper shaft 6. Further, the steering shaft 3 is extendable in an axial direction X. The steering apparatus 1 includes a hollow column jacket 8 that supports the steering shaft 3 such that the steering shaft 3 is rotatable. The steering shaft 3 is inserted into the column jacket 8, so as to be rotatably supported by the column jacket 8 via a plurality of bearings 9, 10.

The column jacket 8 includes a tubular inner jacket 11 that is, for example, an upper jacket, and a tubular outer jacket 12 that is, for example, a lower jacket. The inner jacket 11 and the outer jacket 12 are fitted to each other such that the inner jacket 11 and the outer jacket 12 are slidable relative to each other. The column jacket 8 is extendable in the axial direction X. The inner jacket 11 on an upper side is connected, via the bearing 9, to an upper shaft 6 so as to be movable together with the upper shaft 6 in the axial direction X. The outer jacket 12 on a lower side supports the lower shaft 7 via the bearing 10 such that the lower shaft 7 is rotatable.

The steering apparatus 1 includes a fixed bracket 14 fixed to a vehicle body 13; a tilt central shaft 15 supported by the fixed bracket 14; and a column bracket 16 fixed to an outer peripheral surface of the outer jacket 12 and rotatably supported by the tilt central shaft 15. The column jacket 8 and the steering shaft 3 can pivot (tilt) in a tilt direction Y using a tilt center CC as a fulcrum. The tilt center CC is a central axis of the tilt central shaft 15.

When the steering shaft 3 and the column jacket 8 are caused to pivot (tilt) about the tilt center CC, a position of the steering member 2 can be adjusted (so-called tilt adjustment). Further, when the steering shaft 3 and the column jacket 8 are extended and contracted in the axial direction X, the position of the steering member 2 can be adjusted (so-called telescopic adjustment). The steering apparatus 1 includes a bracket 17 fixed to the vehicle body 13, and a fastening mechanism 18 that achieves a tilt lock and a telescopic lock by fastening a pair of fastened portions 19. The fastened portions 19 are made of the same material as that of the outer jacket 12 so as to be integrated with the upper portion of the outer jacket 12 in the axial direction X.

Figure 2:
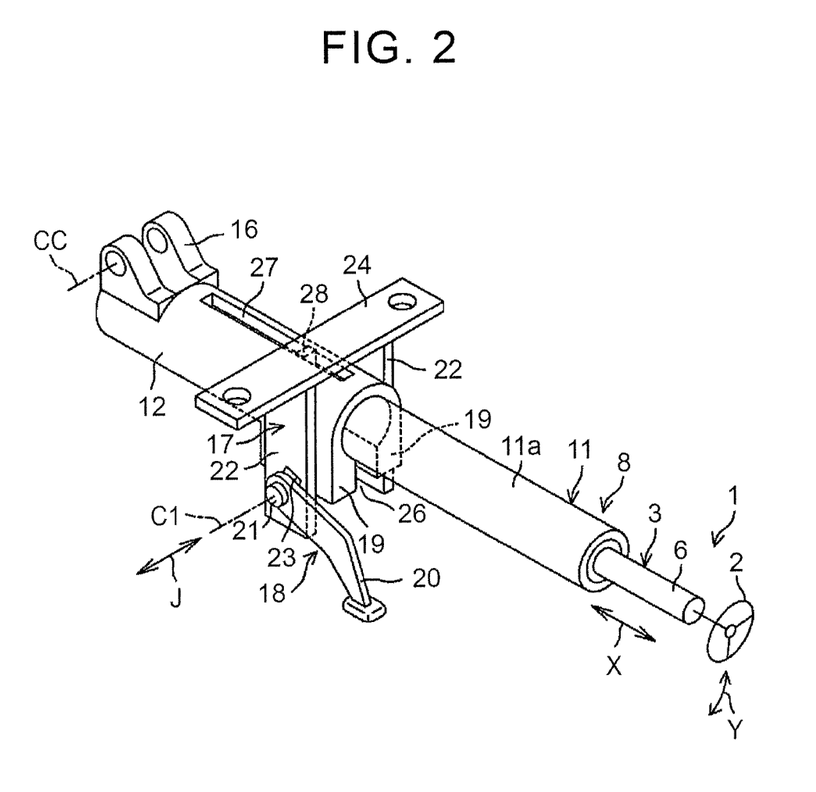
FIG. 2 is a schematic perspective view of the steering apparatus according to the first embodiment.

As illustrated in FIG. 1 and FIG. 2 that is a schematic perspective view, the fastening mechanism 18 includes an operating lever 20 as an operating member rotated by a driver, and a fastening shaft 21 that is rotatable together with the operating lever 20 in an integrated manner. A central axis C1 of the fastening shaft 21 coincides with a center of rotation of the operating lever 20. As illustrated in FIG. 2, the outer jacket 12 has a slit 26 extending downward from an upper end in the axial direction X. The fastened portions 19 are disposed on respective sides of the slit 26. By clamping the pair of fastened portions 19, a diameter of the outer jacket 12 can be reduced elastically.

The outer jacket 12 has a guide groove 27 extending in the axial direction X. A guided protrusion 28 fixed to the inner jacket 11 is fitted to the guide groove 27. The guide groove 27 guides an axial movement of the inner jacket 11 via the guided protrusion 28, and restricts a rotation of the inner jacket 11 relative to the outer jacket 12. Further, due to fitting of the guided protrusion 28 to the guide groove 27, falling-off of the inner jacket 11 from the outer jacket 12 is prevented.

The fastening mechanism 18 achieves a tilt lock by fastening the bracket 17 to the pair of fastened portions 19 of the outer jacket 12 via the fastening shaft 21. Further, the fastening mechanism 18 achieves a telescopic lock such that the inner jacket 11 is clamped immovably in the axial direction X by the outer jacket 12 that is reduced in diameter, by clamping the pair of fastened portions 19 of the outer jacket 12. Thus, the position of the steering member 2 is fixed with respect to the vehicle body 13 (see FIG. 1).

Figure 3:
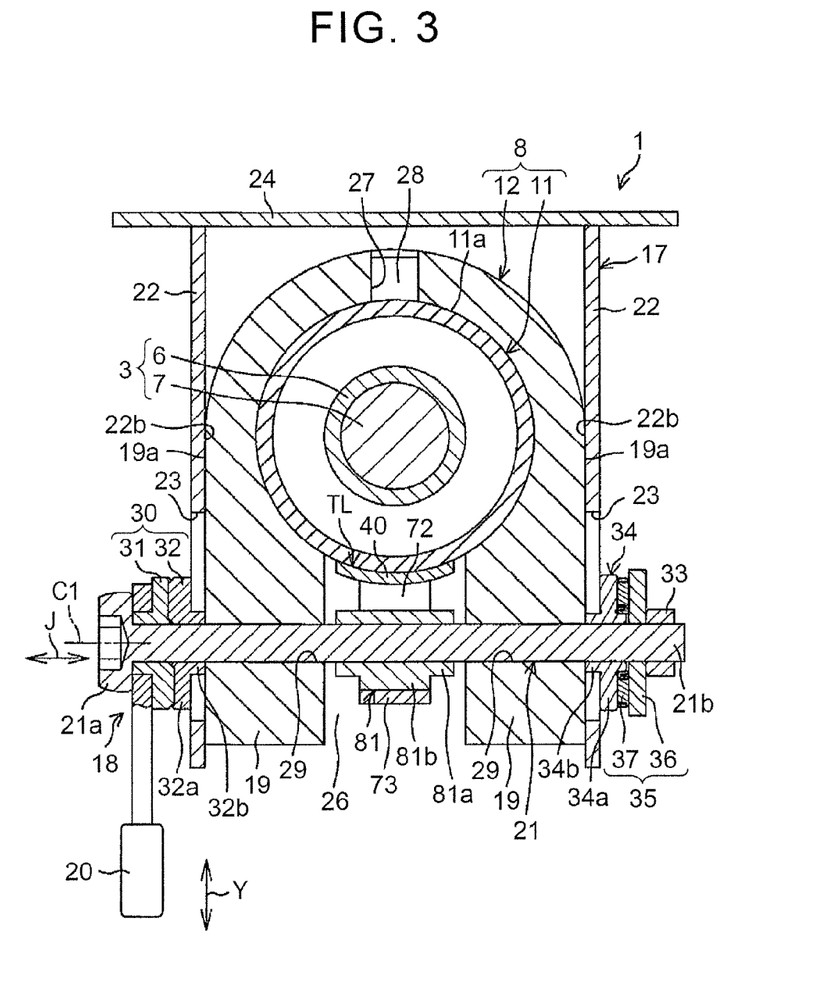
FIG. 3 is a sectional view of a main part of the steering apparatus according to the first embodiment, and corresponds to a sectional view taken along a line III-III in FIG. 1.

The fastening shaft 21 is passed through tilt elongate holes 23 that are respectively provided in a pair of side plates 22 (only one side plate 22 is illustrated in FIG. 1) of the bracket 17 so as to extend in the tilt direction Y. As illustrated in FIG. 3, the bracket 17 includes a mounting plate 24 attached to the vehicle body 13, and a pair of side plates 22 extending downward in the tilt direction Y from respective ends of the mounting plate 24. The pair of fastened portions 19 of the outer jacket 12 is disposed between the pair of side plates 22, and each of the fastened portions 19 has a plate shape extending along an inner surface 22b of a corresponding one of the side plates 22. The inner surface 22b of each of the side plates 22 is opposed to an outer surface 19a of a corresponding one of the fastened portions 19.

Each of the fastened portions 19 of the outer jacket 12 has a fastening shaft passing hole 29, which is a round hole through which the fastening shaft 21 is passed. At the time of tilt adjustment, the fastening shaft 21, the outer jacket 12, the inner jacket 11, and the steering shaft 3 move together in the tilt direction Y. The fastening shaft 21 is constituted by a bolt passing through the tilt elongate holes 23 of both side plates 22 of the bracket 17 and the fastening shaft passing holes 29 of both fastened portions 19 of the outer jacket 12. A larger-diameter head 21a provided in a first end of the fastening shaft 21 is fixed so as to be rotatable together with the operating lever 20 in an integrated manner.

The fastening mechanism 18 further includes a force conversion mechanism 30 that is provided between the head 21a of the fastening shaft 21 and one of the side plates 22. The force conversion mechanism 30 converts an operation torque of the operating lever 20 into an axial force of the fastening shaft 21 (a fastening force to fasten the pair of side plates 22). The force conversion mechanism 30 includes a rotating cam 31 and a fastening member 32. The rotating cam 31 is connected to the operating lever 20 so as to rotate together with the operating lever 20 in an integrated manner. The movement of the rotating cam 31 relative to the fastening shaft 21 in a fastening shaft direction J is restricted. The fastening member 32 is a non-rotatable cam that achieves cam engagement with the rotating cam 31 to fasten one of the side plates 22.

The fastening mechanism 18 further includes a nut 33 screwed to a threaded portion 21b of a second end of the fastening shaft 21, a fastening member 34 that fastens the other one of the side plates 22, and an intervening member 35 provided between the fastening member 34 and the nut 33. The intervening member 35 includes a washer 36 provided between the nut 33 and the fastening member 34; and a needle roller bearing 37 provided between the washer 36 and the fastening member 34.

The fastening member 34 and the intervening member 35 are provided between the nut 33 and the other one of the side plates 22 of the bracket 17. The rotating cam 31, the fastening member 32 (the non-rotatable cam), the fastening member 34, and the intervening member 35 are supported by an outer peripheral surface of the fastening shaft 21. The fastening member 32 (the non-rotatable cam) and the fastening member 34 include respective fastening plate portions 32a, 34a that fasten the corresponding side plates 22, and respective boss portions 32b, 34b fitted to the corresponding tilt elongate holes 23. Rotations of the fastening members 32, 34 are restricted due to fitting of respective boss portions 32b, 34b to the corresponding tilt elongate holes 23.

Further, the fastening member 32 (the non-rotatable cam) and the fastening member 34 are supported by the fastening shaft 21 so as to be movable in the fastening shaft direction J. Along with the rotation of the operating lever 20 toward a lock direction, the rotating cam 31 rotates relative to the fastening member 32 (the non-rotatable cam). Thus, the fastening member 32 is moved in the fastening shaft direction J, so that the pair of side plates 22 of the bracket 17 is clamped and fastened between the fastening members 32, 34 (i.e., between the fastening plate portions 32a, 34a of the fastening members 32, 34).

Thus, each of the side plates 22 of the bracket 17 fastens a corresponding one of the fastened portions 19 of the outer jacket 12. As a result, the movement of the outer jacket 12 in the tilt direction Y is restricted, so that a tilt lock is achieved. Further, when both fastened portions 19 are fastened, the outer jacket 12 is elastically reduced in diameter, so as to fasten the inner jacket 11. Thus, the movement of the inner jacket 11 in the axial direction X is restricted, so that a telescopic lock is achieved.

Figure 4:
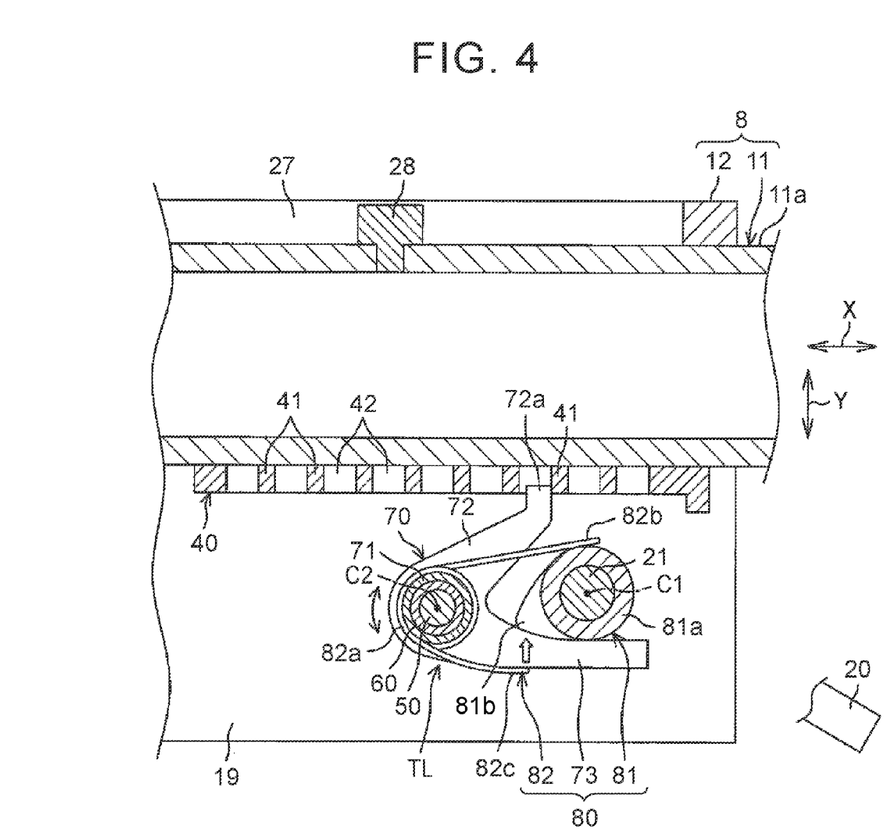
FIG. 4 is a sectional view of the main part of the steering apparatus according to the first embodiment, and illustrates a locked state of a tooth lock mechanism.
Figure 5:
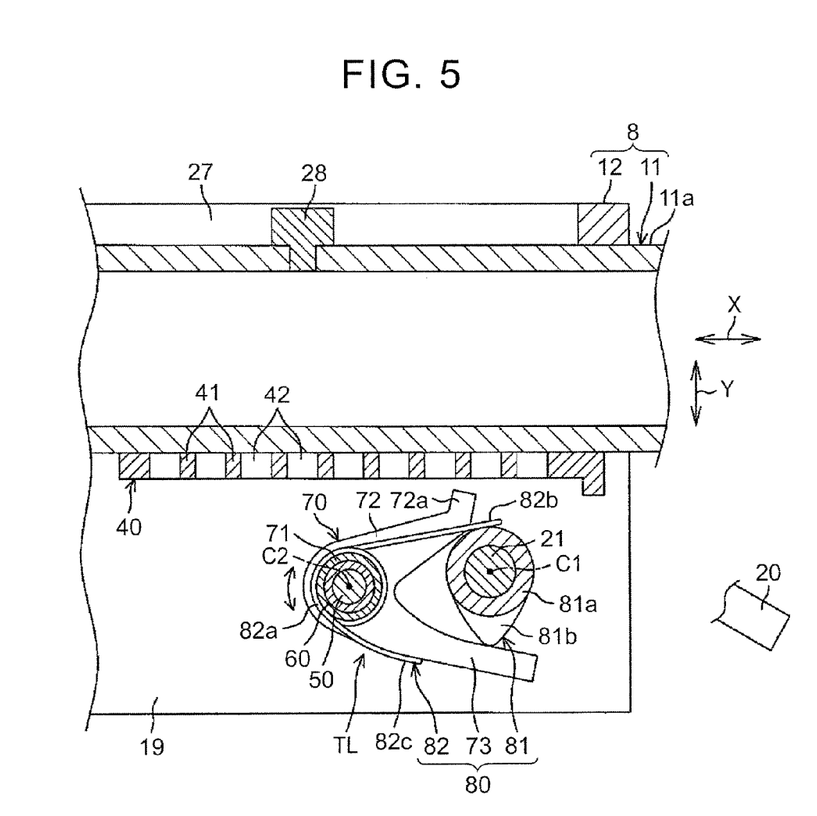
FIG. 5 is a sectional view of the main part of the steering apparatus according to the first embodiment, and illustrates an unlocked state of the tooth lock mechanism.

As illustrated in FIGS. 4 and 5, the steering apparatus 1 includes a tooth lock mechanism TL to improve the force of retaining the telescopic lock. FIG. 4 illustrates a locked state of the tooth lock mechanism TL, and FIG. 5 illustrates an unlocked state (a lock released state) of the tooth lock mechanism TL. The tooth lock mechanism TL includes an engaged tooth formation member 40 fixed to an outer peripheral surface 11a of the inner jacket 11, a support shaft 50 made of resin and supported by the pair of fastened portions 19, an engaging tooth formation member 70 rotatably supported by the support shaft 50 via a tubular intervening member 60, and a linkage mechanism 80 that links a rotation of the engaging tooth formation member 70 with a rotation of the fastening shaft 21 (i.e., that causes the engaging tooth formation member 70 to rotate as the fastening shaft 21 rotates).

Figure 6:
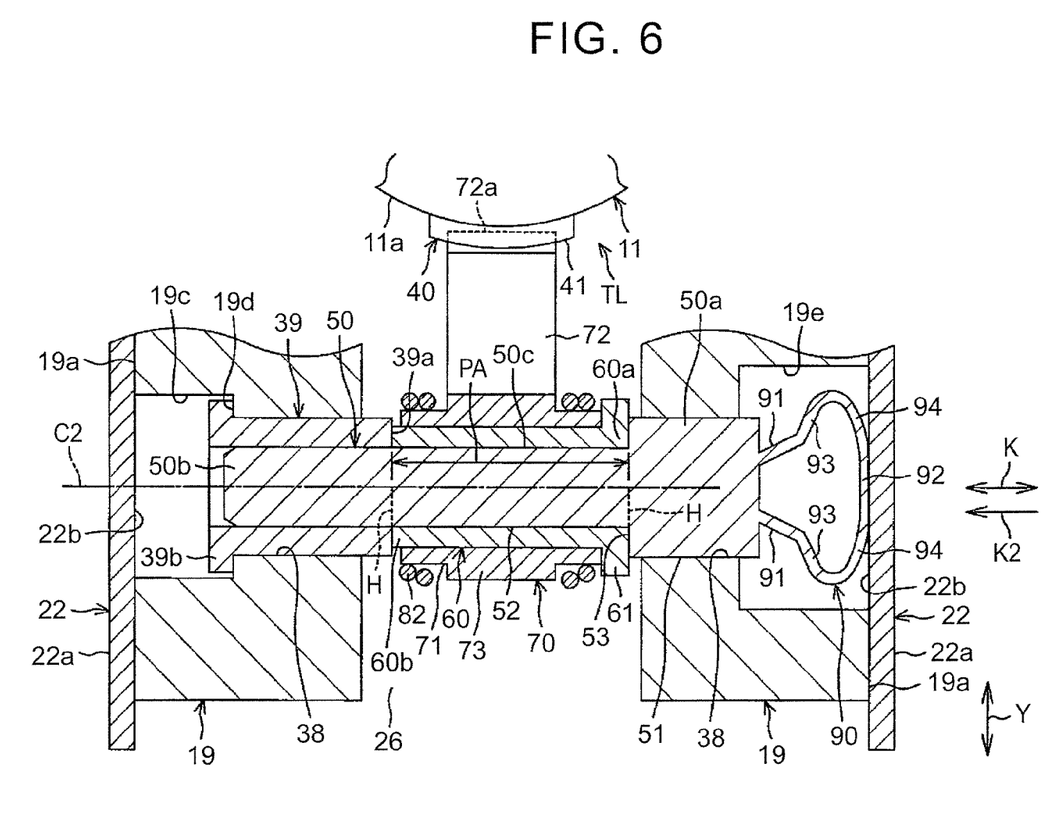
FIG. 6 is a sectional view of the main part of the steering apparatus according to the first embodiment, and illustrates a structure that supports an engaging tooth formation member of the tooth lock mechanism.

The engaged tooth formation member 40 includes a plurality of engaged teeth 41 such that the engaged teeth 41 are arranged at prescribed intervals in the axial direction X. A plurality of grooves 42 may be formed at prescribed intervals in the axial direction X on an elongate plate as a material such that each of the engaged teeth 41 is formed between adjacent grooves 42. As illustrated in FIG. 6, the support shaft 50 includes a first end portion 50a and a second end portion 50b that are both end portions of the support shaft 50 in a support shaft direction K which is a central axis direction of the support shaft 50. Further, an outer peripheral surface 50c of the support shaft 50 includes a large diameter portion 51 provided in the first end portion 50a, a small diameter portion 52 provided in a remaining part other than the large diameter portion 51 and having a diameter smaller than the large diameter portion 51, and a stepped portion 53 constituted by an axially perpendicular surface (i.e., a surface perpendicular to an axial direction of the support shaft 50) formed between the large diameter portion 51 and the small diameter portion 52.

The large diameter portion 51 of the first end portion 50a is directly supported by a support hole 38 of one of the fastened portions 19 (a right one in FIG. 6). The second end portion 50b is inserted into a tubular bush 39 press-fitted and fixed to a support hole 38 of the other one of the fastened portions 19 (a left one in FIG. 6), so that the second end portion 50b is supported. Since the bush 39 is press-fitted and fixed to the support hole 38, an axial movement of the bush 39 relative to the support hole 38 is restricted.

More specifically, the bush 39 includes one end surface 39a that contacts an end surface of the intervening member 60, and also includes a positioning flange 39b provided on an end opposite to the one end surface 39a and extending radially outwardly. The positioning flange 39b is accommodated in a receptacle recessed portion 19c provided in the outer surface 19a of the other fastened portion 19. The receptacle recessed portion 19c communicates with the support hole 38, and has a diameter larger than a diameter of the support hole 38. An end surface of the positioning flange 39b contacts a bottom part 19d of the receptacle recessed portion 19c such that the bush 39 is positioned in an axial direction of the support hole 38.

The intervening member 60 is fitted to a prescribed area PA between both end portions 50a, 50b of the support shaft 50, in an outer peripheral surface 50c of the support shaft 50 (the prescribed area PA corresponds to an axial area of a part of the small diameter portion 52). The intervening member 60 is provided between the one end surface 39a of the bush 39 and the stepped portion 53. A first end portion 60a of the intervening member 60 is in contact with the stepped portion 53 between the large diameter portion 51 and the small diameter portion 52. More specifically, a flange 61, which is provided in the first end portion 60a of the intervening member 60 and extends radially outwardly, is in contact with the stepped portion 53. An end surface of a second end portion 60b of the intervening member 60 is in contact with the one end surface 39a of the bush 39.

A biasing member 90 provided integrally with the first end portion 50a of the support shaft 50 is disposed between the first end portion 50a (that is, the large diameter portion 51) of the support shaft 50 and the side plate 22 that is opposed to the first end portion 50*a*. The biasing member 90 biases the support shaft 50 using a reaction force that presses the side plate 22, in a biasing direction K2 directed toward the second end portion 50*b*-side in the support shaft direction K. The biasing member 90 is accommodated in a receptacle recessed portion 19*e* provided in the outer surface 19*a* of the one fastened portion 19. The receptacle recessed portion 19*e* communicates with the support hole 38 and has a diameter larger than a diameter of the support hole 38.

The biasing member 90 and the support shaft 50 are formed of a single material so as to be integrated with each other (the biasing member 90 and the support shaft 50 are formed of a single material as one unit). The biasing member 90 is a pantograph-shaped leaf spring elastically extendable in the support shaft direction K. That is, the biasing member 90 includes a pair of support portions 91 each of which has a first end connected to an end surface of the first end portion 50*a* of the support shaft 50; a top portion 92 that makes press contact with the inner surface 22*b* of the side plate 22 (i.e., that contacts and presses the inner surface 22*b* of the side plate 22); a pair of first links 93 each of which is connected to a second end of a corresponding one of the support portions 91; and a pair of second links 94 each of which connects a corresponding one of the first links 93 to the top portion 92.

A biasing force of the biasing member 90 is received by the one end surface 39*a* of the bush 39 via the stepped portion 53 and the intervening member 60. A movement of the support shaft 50 in the biasing direction K2 is restricted by the one end surface 39*a* of the bush 39. That is, the one end surface 39*a* of the bush 39 functions as a positioning portion that positions the support shaft 50 in the biasing direction K2. In other words, the other fastened portion 19 indirectly positions the support shaft 50 via the bush 39.

In the support shaft 50, a pair of to-be-broken portions H is provided. The to-be-broken portions H are provided at positions on respective sides of the prescribed area PA to which the intervening member 60 is fitted (that is, positions on respective sides of the intervening member 60). At the time of a secondary collision, the support shaft 50 breaks at the pair of to-be-broken portions H. More specifically, when a prescribed impact load or more is applied from the steering shaft 3 to the engaging tooth formation member 70 via the inner jacket 11 and the engaged tooth formation member 40 at the time of a secondary collision, the support shaft 50 breaks at the pair of to-be-broken portions H.

The intervening member 60 may have a strength that is higher than a strength of the support shaft 50. That is, a resin member or a metal member having a strength higher than a strength of a resin forming the support shaft 50 may be used as the intervening member 60. The engaging tooth formation member 70 includes a boss portion 71 that surrounds the outer peripheral surface of the support shaft 50, and an engaging tooth formation arm 72 extending in a projecting manner from an outer peripheral surface of the boss portion 71 and having a distal end provided with an engaging tooth 72*a* that can engage with any one of the engaged teeth 41.

The linkage mechanism 80 includes a cam member 81 connected to the fastening shaft 21 so as to be rotatable together with the fastening shaft 21 in an integrated manner; a cam follower arm 73 that is provided so as to be rotatable together with the engaging tooth formation member 70 in an integrated manner, and driven by the cam member 81; and a biasing member 82 that rotatively biases the engaging tooth formation member 70 via the cam follower arm 73 in such a direction that the engaging tooth 72*a* engages with any one of the engaged teeth 41. The cam member 81 includes a boss portion 81*a* fitted to an outer peripheral surface of the fastening shaft 21; and a cam projection 81*b* projecting radially outwardly from the boss portion 81*a*.

The biasing member 82 is constituted by a torsion spring, for example. That is, the biasing member 82 includes a coiled portion 82*a* that surrounds the boss portion 71 of the engaging tooth formation member 70; a first engagement portion 82*b* that extends from the coiled portion 82*a* so as to engage with an outer peripheral surface of the boss portion 81*a* of the cam member 81; and a second engagement portion 82*c* that engages with the cam follower arm 73. The biasing member 82 rotatively biases the engaging tooth formation member 70 in a counterclockwise direction in FIG. 4 (indicate by a hollow arrow in FIG. 4). In a state where the engaging tooth 72*a* of the engaging tooth formation member 70 biased by the biasing member 82 so as to rotate counterclockwise engages with any one of the engaged teeth 41, a tooth lock is achieved as illustrated in FIG. 4.

That is, when the operating lever 20 and the fastening shaft 21 are rotated in a lock direction (a clockwise direction in FIG. 5) about the central axis C1 of the fastening shaft 21 from an unlocking state illustrated in FIG. 5, the cam projection 81*b* allows a counterclockwise rotation of the cam follower arm 73 about a central axis C2 of the support shaft 50. Thus, due to the action of the biasing member 82, the engaging tooth formation member 70 rotates counterclockwise, so that the engaging tooth 72*a* engages with any one of the engaged teeth 41 as illustrated in FIG. 4. In this way, a tooth lock is achieved.

When the operating lever 20 is rotated in an unlocking direction (counterclockwise in FIG. 4) from the locked state illustrated in FIG. 4, the cam projection 81*b* rotates the engaging tooth formation member 70 clockwise about the central axis C2 via the cam follower arm 73 against the biasing member 82, as illustrated in FIG. 5. Thus, the engaging tooth 72*a* is disengaged from any one of the engaged teeth 41, so that the tooth lock is released.

According to the present embodiment, the support shaft 50 is biased by the biasing member 90 provided in the first end portion 50*a*, in the biasing direction K2 directed toward the second end portion 50*b*, and the support shaft 50 is positioned in the biasing direction by the positioning portion (the one end surface 39*a*) of the bush 39 supported by the fastened portion 19. A backlash of the support shaft 50 in the support shaft direction K is unlikely to occur with respect to components in the vicinity of the support shaft 50 (i.e., the intervening member 60 and the engaging tooth formation member 70). Due to the biasing of the biasing member 90, it is possible to eliminate a gap between members (e.g., the intervening member 60 and the bush 39) that shear the support shaft 50 at the time of a secondary collision, and it is possible to stabilize a shear load of the support shaft 50.

Further, since the support shaft 50 and the biasing member 90 can be fitted as one unit at the time of assembly, it is possible to increase ease of assembly. Further, since the support shaft 50 and the biasing member 90 are formed of a single material so as to be integrated with each other (i.e., since the support shaft 50 and the biasing member 90 are formed of a single material as one unit), it is possible to reduce manufacturing cost. Further, both end portions 60*a*, 60*b* of the intervening member 60 fitted to the small diameter portion 52 of the support shaft 50 are respectively in contact with the stepped portion 53 of the support shaft 50 and the one end surface 39*a* (the positioning portion) of the bush 39. This makes it possible to reliably break the support shaft 50 at positions of both ends of the intervening member 60 at the time of a secondary collision.

Figure 7:
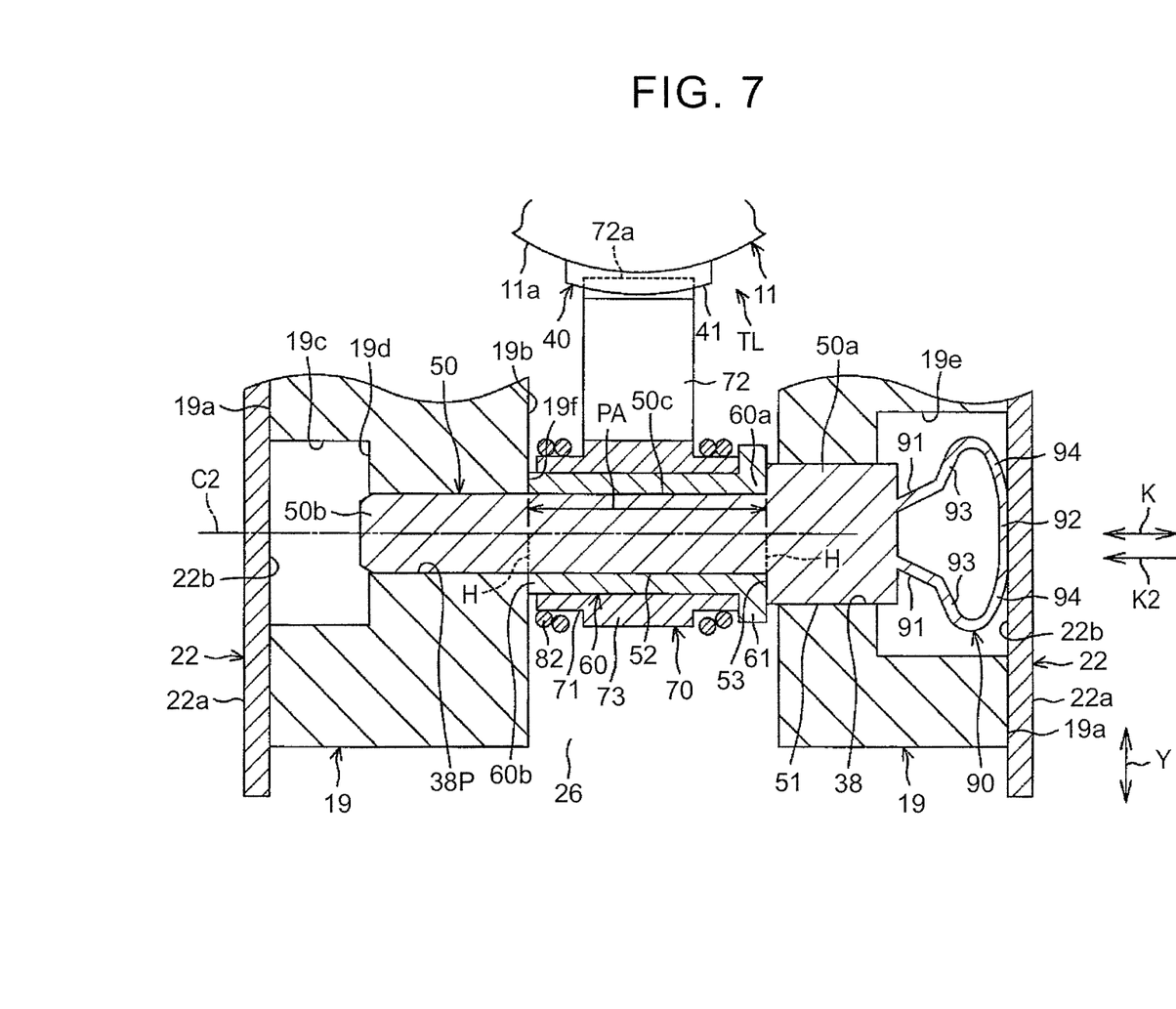
FIG. 7 is a sectional view of a main part of a steering apparatus according to a second embodiment, and illustrates a structure that supports an engaging tooth formation member of a tooth lock mechanism.

FIG. 7 illustrates a second embodiment of the present invention. The second embodiment in FIG. 7 is different from the first embodiment in FIG. 6 mainly in the following point. That is, the bush 39 is omitted, and the second end portion 50*b* of the support shaft 50 is directly supported by a support hole 38P. Further, the fastened portion 19 that supports the second end portion 50*b* of the support shaft 50 has an inner surface 19*b* provided with a positioning portion 19*f* that is in contact with the end surface of the second end portion 60*b* of the intervening member 60.

Among constituents in the second embodiment of FIG. 7, the same constituents as constituents in the first embodiment of FIG. 6 have the same reference numerals as reference numerals of the constituents in the first embodiment of FIG. 6. According to the second embodiment, the support shaft 50 biased in the biasing direction K2 directed toward the second end portion 50*b*-side is positioned in the biasing direction K2 via the intervening member 60 by the positioning portion 19*f* provided in the fastened portion 19. Thus, a backlash of the support shaft 50 in the support shaft direction K is unlikely to occur with respect to components in the vicinity of the support shaft 50 (i.e., the intervening member 60 and the engaging tooth formation member 70). Further, a shear load of the support shaft 50 at the time of a secondary collision is stabilized.

Further, the both end portions 60*a*, 60*b* of the intervening member 60 fitted to the small diameter portion 52 of the support shaft 50 are respectively in contact with the stepped portion 53 of the support shaft 50 and the positioning portion 19*f* of the fastened portion 19. This makes it possible to reliably break the support shaft 50 at positions of both ends of the intervening member 60 at the time of a secondary collision. The present invention is not limited to each of the above embodiments. For example, the biasing member 90 may be a leaf spring extending in a meandering shape. The biasing member 90 may be formed separately from the support shaft 50 and fixed to the support shaft 50 integrally. Further, the steering apparatus 1 is not limited to a manual-type steering apparatus, but may be an electric power steering apparatus in which power of an electric motor is supplied to the steering shaft 3 so as to assist steering. In addition, the embodiments of the present invention may be modified variously within the scope of the present invention.

What is claimed is:

1. A steering apparatus comprising:
a steering shaft extendable in an axial direction;
a column jacket extendable in the axial direction, the column jacket including an outer jacket including a slit and a pair of fastened portions provided on respective sides of the slit, and an inner jacket fitted to the outer jacket, the column jacket being configured to support the steering shaft such that the steering shaft is rotatable;
a bracket including a pair of side plates provided on respective sides of the pair of fastened portions, the bracket being fixed to a vehicle body;
a fastening mechanism including a fastening shaft passed through fastening shaft passing holes of the pair of fastened portions, and an operating lever that rotates the fastening shaft, the fastening mechanism being configured to cause the outer jacket to hold the inner jacket by fastening the pair of fastened portions via the pair of side plates using the fastening shaft;
an engaged tooth formation member including at least one engaged tooth and fixed to the inner jacket;
a support shaft including a first end portion and a second end portion supported by support holes of the pair of fastened portions, the support shaft being configured to break at a time of a secondary collision;
an engaging tooth formation member including an engaging tooth that engages with any one of the at least one engaged tooth, the engaging tooth formation member being rotatably supported by the support shaft, and being configured to rotate in accordance with an operation of the operating lever such that the engaging tooth engages with or disengages from any one of the at least one engaged tooth; and
a biasing member provided between the first end portion of the support shaft and one of the side plates opposed to the first end portion, the biasing member being configured to bias the support shaft in a biasing direction directed toward the second end portion of the support shaft, wherein one of the fastened portions opposed to another of the side plates, or a member supported by the one fastened portion includes a positioning portion configured to position the support shaft in the biasing direction.

2. The steering apparatus according to claim 1, wherein the support shaft and the biasing member constitute one unit.

3. The steering apparatus according to claim 2, wherein the support shaft and the biasing member are formed of a single material so as to be integrated with each other.

4. The steering apparatus according to claim 1, wherein:
the support shaft includes a small diameter portion, a large diameter portion having a diameter larger than a diameter of the small diameter portion, and a stepped portion provided between the small diameter portion and the large diameter portion;
the positioning portion positions the support shaft in the biasing direction via an intervening member fitted to the small diameter portion so as to be in contact with the stepped portion and the positioning portion; and
the support shaft is configured to break at positions of both ends of the intervening member at the time of the secondary collision.

\* \* \* \* \*